United States Patent
Weindorf

(10) Patent No.: US 11,699,403 B2
(45) Date of Patent: Jul. 11, 2023

(54) DISPLAY SYSTEM

(71) Applicant: VISTEON GLOBAL TECHNOLOGIES, INC., Van Buren Township, MI (US)

(72) Inventor: Paul Fredrick Luther Weindorf, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 2 days.

(21) Appl. No.: 17/433,521

(22) PCT Filed: Feb. 24, 2020

(86) PCT No.: PCT/US2020/019489
§ 371 (c)(1),
(2) Date: Aug. 24, 2021

(87) PCT Pub. No.: WO2020/176408
PCT Pub. Date: Sep. 3, 2020

(65) Prior Publication Data
US 2022/0157264 A1    May 19, 2022

Related U.S. Application Data

(63) Continuation-in-part of application No. 16/284,627, filed on Feb. 25, 2019, now Pat. No. 11,256,135.

(Continued)

(51) Int. Cl.
*G09G 3/34* (2006.01)
*G02F 1/1347* (2006.01)

(52) U.S. Cl.
CPC ......... *G09G 3/3406* (2013.01); *G02F 1/1347* (2013.01); *G09G 3/3426* (2013.01);

(Continued)

(58) Field of Classification Search
CPC ............... G09G 3/3406; G09G 3/3426; G09G 2300/0439; G09G 2320/068; G09G 2320/0686; G09G 2380/10; G02F 1/1347
See application file for complete search history.

(56) References Cited

U.S. PATENT DOCUMENTS 5,299,039 A    3/1994  Bohannon
5,686,979 A   11/1997  Weber et al.
(Continued)

FOREIGN PATENT DOCUMENTS

| JP | 2010134269 A | 6/2010 |
| WO | 2009107536 A1 | 9/2009 |
| WO | 2011162133 A1 | 12/2011 |

OTHER PUBLICATIONS

Panasonic Develops Industry's First IPS Liquid Crystal Panel with Contrast Ration of over 1,000,000:1, Panasonic Corporation Press Release, Nov. 28, 2016, pp. 1-5, Panasonic Corporation.

*Primary Examiner* — William Boddie
*Assistant Examiner* — Saifeldin E Elnafia
(74) *Attorney, Agent, or Firm* — Quinn IP Law

(57) ABSTRACT

A local-dimming display generally includes a light source configured to generate a backlight, a first display aligned with the light source and having multiple first pixels, wherein each first pixel is configured to selectively pass and block the backlight, and a second display aligned with the first display and having multiple second pixels. A particular pixel is controlled to pass the backlight. The particular pixel corresponds with an aligned pixel and multiple parallax pixels of the first pixels controlled at a first transmit level, and multiple neighboring pixels of the first pixels controlled at one or more second transmit levels. The one or more second transmit levels are less than or equal to the first transmit level. The first pixels cooperating at the first transmit level and the second transmit levels selectively presents (Continued)

the backlight to the second display with a declining intensity pattern in the neighboring pixels.

20 Claims, 10 Drawing Sheets

Related U.S. Application Data

(60) Provisional application No. 62/958,006, filed on Jan. 7, 2020.

(52) U.S. Cl.
CPC ............ *G09G 2300/0439* (2013.01); *G09G 2320/068* (2013.01); *G09G 2320/0686* (2013.01); *G09G 2380/10* (2013.01)

(56) References Cited

U.S. PATENT DOCUMENTS

| | | | |
|---|---|---|---|
| 5,818,522 A | 10/1998 | Sato | |
| 7,106,396 B2 | 9/2006 | Suzuki | |
| 7,268,841 B2 | 9/2007 | Kasajima et al. | |
| 7,495,719 B2 | 2/2009 | Adachi et al. | |
| 7,916,223 B2 | 3/2011 | Kitagawa et al. | |
| 3,045,098 A1 | 10/2011 | Kitagawa et al. | |
| 8,248,555 B2 | 8/2012 | Senoue et al. | |
| 8,482,698 B2 | 7/2013 | Atkins | |
| 8,672,493 B2 | 3/2014 | Tsuda et al. | |
| 8,891,042 B1 | 11/2014 | Osterman et al. | |
| 9,329,430 B2 | 5/2016 | Erinjippurath et al. | |
| 9,535,280 B2 | 1/2017 | Borrelli et al. | |
| 9,684,204 B2 | 6/2017 | Sakai et al. | |
| 9,772,530 B2 | 9/2017 | Gilbert | |
| 9,860,516 B2 | 1/2018 | Muneki et al. | |
| 9,864,243 B2 | 1/2018 | Erinjippurath et al. | |
| 10,056,022 B2 | 8/2018 | Bonnier et al. | |
| 10,191,337 B2 | 1/2019 | Ono | |
| 10,310,346 B2 | 6/2019 | Kim et al. | |
| 2004/0218118 A1 | 11/2004 | Hayashi | |
| 2005/0088401 A1 | 4/2005 | Daly | |
| 2006/0191177 A1 | 8/2006 | Engel | |
| 2008/0007486 A1 | 1/2008 | Fujinawa et al. | |
| 2008/0225512 A1 | 9/2008 | Roberts et al. | |
| 2009/0051707 A1* | 2/2009 | Hirata | G09G 3/3648 348/731 |
| 2009/0189543 A1 | 7/2009 | Yeo et al. | |
| 2009/0243504 A1 | 10/2009 | Cho et al. | |
| 2009/0284518 A1 | 11/2009 | Sawabe | |
| 2009/0303419 A1 | 12/2009 | Koma | |
| 2010/0118006 A1* | 5/2010 | Kimura | G09G 3/3611 348/673 |
| 2011/0141154 A1 | 6/2011 | Ahn et al. | |
| 2011/0164207 A1 | 7/2011 | Arai et al. | |
| 2012/0274878 A1 | 11/2012 | Kunz et al. | |
| 2013/0076704 A1 | 3/2013 | Song et al. | |
| 2013/0141668 A1 | 6/2013 | Washio et al. | |
| 2013/0335682 A1 | 12/2013 | Gilbert et al. | |
| 2014/0293188 A1 | 10/2014 | Casebolt et al. | |
| 2015/0198834 A1 | 7/2015 | Wu et al. | |
| 2016/0004137 A1 | 1/2016 | Sagardoyburu | |
| 2016/0119613 A1 | 4/2016 | Smith | |
| 2016/0170702 A1 | 6/2016 | Jiang et al. | |
| 2016/0372058 A1 | 12/2016 | Wang et al. | |
| 2017/0031206 A1 | 2/2017 | Broughton et al. | |
| 2018/0011365 A1 | 1/2018 | Shields et al. | |
| 2018/0031897 A1 | 2/2018 | Kikuchi et al. | |
| 2018/0120634 A1* | 5/2018 | Chen | G02B 6/0053 |
| 2018/0275445 A1 | 9/2018 | Katagiri et al. | |
| 2018/0286325 A1 | 10/2018 | Koudo et al. | |
| 2019/0129213 A1 | 5/2019 | Cho et al. | |
| 2019/0171045 A1 | 6/2019 | Masuda | |

* cited by examiner

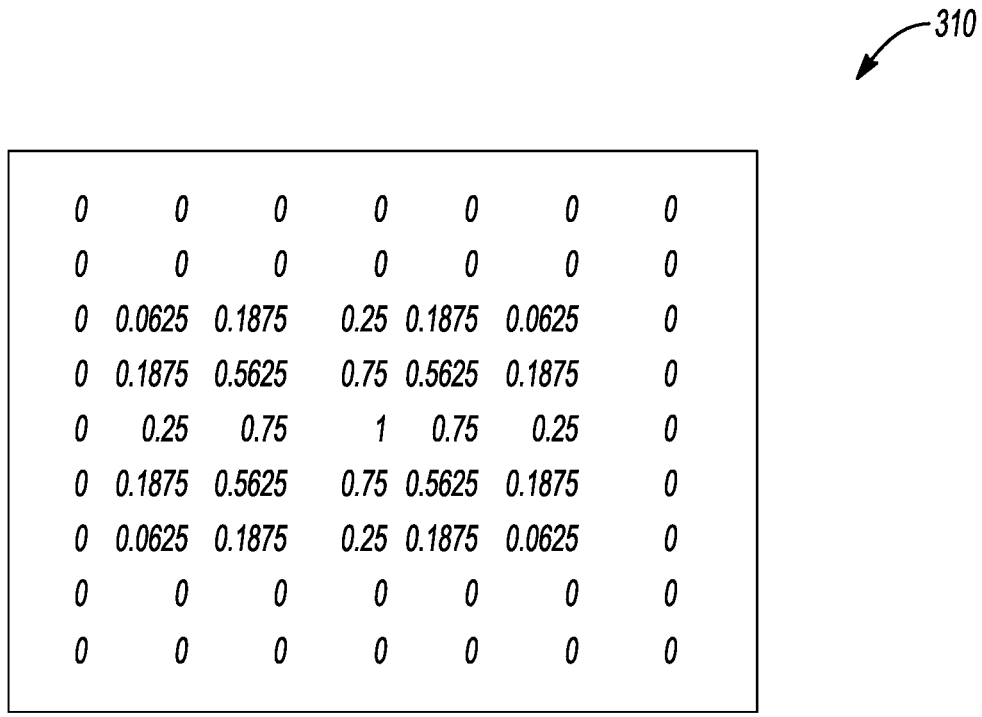
Fig-13
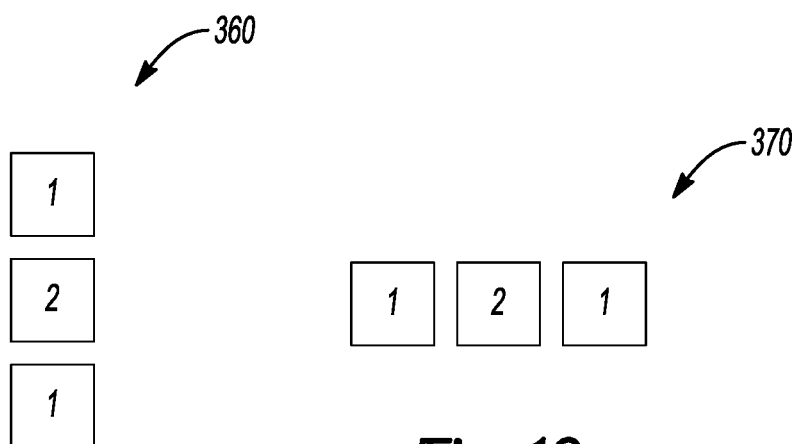
Fig-18
Fig-19

DISPLAY SYSTEM

CROSS-REFERENCE TO RELATED APPLICATIONS

This application is a Continuation-In-Part of U.S. Ser. No. 16/284,627, filed Feb. 25, 2019, and claims the benefit of U.S. Provisional Application No. 62/958,006, filed Jan. 7, 2020, each of which are hereby incorporated by reference in their entirety.

TECHNICAL FIELD

The present disclosure generally relates to display systems and methods for a dual cell Gaussian algorithm in a local-dimming display to render a rear display less noticeable, such as within an electronic instrument panel of a vehicle.

BACKGROUND

A conventional vehicle includes an instrument panel. The instrument panel may include clusters of gauges and one or more displays, with each presenting operationally relevant information to a user. An instrument panel may be positioned within the user's field of view. The individual gauges and displays are configured to convey particular pieces of information, such as a remaining fuel level, a current speed and heading, and an ambient, external, and/or component-level temperature.

Conventional displays used in the instrument panel may include zone backlighting to increase a contrast ratio between white areas and black areas. However, the zones are generally much larger than a pixel size of the display. Therefore, the large zones lead to a bleed through "glow" or "halo" around lit pixels of the display.

SUMMARY

This section provides a general summary of the disclosure and is not a comprehensive disclosure of its full scope or all of its features, aspects or objectives.

A local-dimming display is provided herein. The local-dimming display generally includes a light source, a first display and a second display. The light source is configured to generate a backlight. The first display is aligned with the light source and includes a plurality of first pixels. Each of the plurality of first pixels is configured to selectively pass and block the backlight. The second display is aligned with the first display and includes a plurality of second pixels.

A particular pixel of the plurality of second pixels is controlled to pass the backlight. The particular pixel corresponds with an aligned pixel of the plurality of first pixels, a plurality of parallax pixels of the plurality of first pixels, and a plurality of neighboring pixels of the plurality of first pixels. The aligned pixel is controlled to pass the backlight at a first transmit level. The plurality of parallax pixels are controlled to pass the backlight at the first transmit level and surround the aligned pixel. The plurality of neighboring pixels are controlled to pass the backlight at one or more second transmit levels and surround the plurality of parallax pixels. The one or more second transmit levels are less than or equal to the first transmit level. The plurality of the first pixels cooperating at the first transmit level and the one or more second transmit levels selectively presents the backlight to the second display with a declining intensity pattern in the plurality of neighboring pixels.

In one or more embodiments of the local-dimming display, the declining intensity pattern is a Gaussian tapering in the one or more second transmit levels.

In one or more embodiments of the local-dimming display, a plurality of buffer pixels of the plurality of first pixels are disposed between the plurality of parallax pixels and the plurality of neighboring pixels, and controlled to the first transmit level.

In one or more embodiments of the local-dimming display, the declining intensity pattern extends through the plurality of buffer pixels.

In one or more embodiments of the local-dimming display, the plurality of parallax pixels form at least a 3×3 array centered around the aligned pixel.

In one or more embodiments of the local-dimming display, a second particular pixel of the plurality of second pixels controlled to pass the backlight corresponds with a second aligned pixel of the plurality of first pixels at the first transmit level, a plurality of second parallax pixels of the plurality of first pixels at the first transmit level, and a plurality of second neighboring pixels of the plurality of first pixels at the one or more second transmit levels. The plurality of second parallax pixels surround the second aligned pixel. The plurality of second neighboring pixels surround the plurality of second parallax pixels.

In one or more embodiments of the local-dimming display, one or more overlapping pixels of the plurality of first pixels set to the first transmit level due to the particular pixel and set to the one or more second transmit levels due to the second particular pixel are set to the first transmit level.

In one or more embodiments of the local-dimming display, one or more overlapping pixels of the plurality of first pixels set to two different levels of the one or more second transmit levels due to the particular pixel and the second particular pixel are set to a highest of the two different levels.

In one or more embodiments of the local-dimming display, the first display is a monochrome display and the plurality of first pixels are a plurality of monochrome pixels.

In one or more embodiments of the local-dimming display, the second display is a color display and the plurality of second pixels are a plurality of color pixels.

An instrument panel is provided herein. The instrument panel includes an electronic control unit and a plurality of displays in electrical communication with the electronic control unit. At least one of the plurality of displays includes a light source configured to generate a backlight, a monochrome display aligned with the light source and having a plurality of monochrome pixels, wherein each of the plurality of monochrome pixels is configured to selectively pass and block the backlight, and a color display aligned with the monochrome display and having a plurality of color pixels.

A particular pixel of the plurality of color pixels is controlled to pass the backlight. The particular pixel corresponds with an aligned pixel of the plurality of monochrome pixels, a plurality of parallax pixels of the plurality of monochrome pixels, and a plurality of neighboring pixels of the plurality of monochrome pixels. The aligned pixel is controlled to pass the backlight at a first transmit level. The plurality of parallax pixels are controlled to pass the backlight at the first transmit level and surround the aligned pixel. The plurality of neighboring pixels are controlled to pass the backlight at one or more second transmit levels and surround the plurality of parallax pixels. The one or more second transmit levels are less than or equal to the first transmit level. The plurality of the monochrome pixels cooperating at the first transmit level and the one or more second transmit levels selectively present the backlight to the color display with a declining intensity pattern in the plurality of neighboring pixels.

In one or more embodiments of the instrument panel, the declining intensity pattern is a Gaussian tapering in the one or more second transmit levels.

In one or more embodiments of the instrument panel, a plurality of buffer pixels of the plurality of monochrome pixels are disposed between the plurality of parallax pixels and the plurality of neighboring pixels, and controlled to the first transmit level.

In one or more embodiments of the instrument panel, the declining intensity pattern extends through the plurality of buffer pixels.

In one or more embodiments of the instrument panel, the plurality of parallax pixels form at least a 3×3 array centered around the aligned pixel.

In one or more embodiments of the instrument panel, a second particular pixel of the plurality of color pixels controlled to pass the backlight corresponds with a second aligned pixel of the plurality of monochrome pixels at the first transmit level, a plurality of second parallax pixels of the plurality of monochrome pixels at the first transmit level, and a plurality of second neighboring pixels of the plurality of monochrome pixels at the one or more second transmit levels. The plurality of second parallax pixels surround the second aligned pixel. The plurality of second neighboring pixels surround the plurality of second parallax pixels.

In one or more embodiments of the instrument panel, one or more overlapping pixels of the plurality of monochrome pixels set to the first transmit level due to the particular pixel and set to the one or more second transmit levels due to the second particular pixel are set to the first transmit level.

In one or more embodiments of the instrument panel, one or more overlapping pixels of the plurality of monochrome pixels set to two different levels of the one or more second transmit levels due to the particular pixel and the second particular pixel are set to a highest of the two different levels.

In one or more embodiments of the instrument panel, the electronic control unit and the plurality of displays are mountable in a vehicle.

A non-transitory computer readable medium is provided herein. The non-transitory computer readable medium has recorded instructions, executable by a processor, for control of a local-dimming display. Execution of the instructions causes the processor to control a light source of the local-dimming display. The light source is configured to generate a backlight, The processor controls a monochrome display of the local-dimming display. The monochrome display is aligned with the light source and has a plurality of monochrome pixels. Each of the plurality of monochrome pixels is configured to selectively pass and block the backlight. The processor controls a color display of the local-dimming display. The color display is aligned with the monochrome display and has a plurality of color pixels.

A particular pixel of the plurality of color pixels is controlled to pass the backlight. The particular pixel corresponds with an aligned pixel of the plurality of monochrome pixels, a plurality of parallax pixels of the plurality of monochrome pixels, and a plurality of neighboring pixels of the plurality of monochrome pixels. The aligned pixel is controlled to pass the backlight at a first transmit level. The plurality of parallax pixels are controlled to pass the backlight at the first transmit level and surround the aligned pixel. The plurality of neighboring pixels are controlled to pass the backlight at one or more second transmit levels and surround the plurality of parallax pixels. The one or more second transmit levels are less than or equal to the first transmit level. The plurality of the monochrome pixels cooperating at the first transmit level and the one or more second transmit levels selectively present the backlight to the color display with a declining intensity pattern in the plurality of neighboring pixels.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 13 illustrates a normalized filtered output image with buffered pixels in accordance with one or more embodiments of the platform.

FIG. 15 illustrates a third filtered output image with parallax pixels in accordance with one or more embodiments of the platform.

FIG. 16 illustrates a fourth input image in accordance with one or more embodiments of the platform.

FIG. 17 illustrates a fourth filtered output image in accordance with one or more embodiments of the platform.

FIG. 18 illustrates a vertical one-dimensional Gaussian kernel in accordance with one or more embodiments of the platform.

FIG. 19 illustrates a horizontal one-dimensional Gaussian kernel in accordance with one or more embodiments of the platform.

Figure 1:
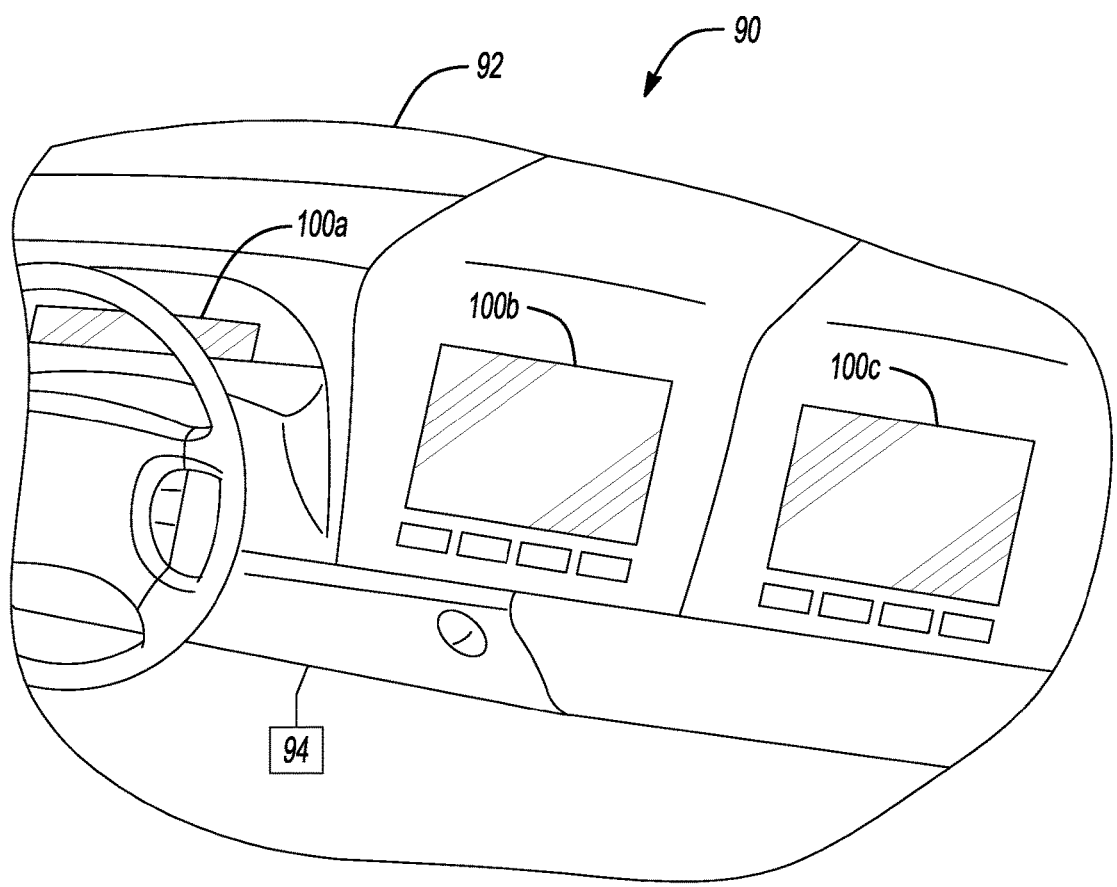
FIG. 1 illustrates a context of a platform.

The present disclosure may have various modifications and alternative forms, and some representative embodiments are shown by way of example in the drawings and will be described in detail herein. Novel aspects of this disclosure are not limited to the particular forms illustrated in the above-enumerated drawings. Rather, the disclosure is to cover modifications, equivalents, and combinations falling within the scope of the disclosure.

DETAILED DESCRIPTION

Those having ordinary skill in the art will recognize that terms such as "above," "below," "front," "back," "upward,"

"downward," "top," "bottom," etc., may be used descriptively herein without representing limitations on the scope of the disclosure. Furthermore, the present teachings may be described in terms of functional and/or logical block components and/or various processing steps. Such block components may be comprised of various hardware components, software components executing on hardware, and/or firmware components executing on hardware.

FIG. 1 illustrates a context of a platform 90. The platform 90 generally includes a body 92, an electronic control unit 94 and one or more displays 100a-100c. The body 92 may implement a body of a vehicle. The vehicle may include mobile vehicles such as automobiles, trucks, motorcycles, boats, trains and/or aircraft. In some embodiments, the body 92 may be part of a stationary object. The stationary objects may include, but are not limited to, billboards, kiosks and/or marquees. Other types of platforms 90 may be implemented to meet the design criteria of a particular application.

The electronic control unit 94 may implement one or more display-drive circuits. The electronic control unit 94 is generally operational to generate control signals that drive the displays 100a-100c. In various embodiments, the control signals may be configured to provide instrumentation (e.g. speed, tachometer, fuel, temperature, etc.) to at least one of the displays 100a-100c (e.g., 100a). In some embodiments, the control signals may also be configured to provide video (e.g., a rear-view camera video, a forward-view camera video, an on-board DVD player, etc.) to the displays 100a-100c. In other embodiments, the control signals may be further configured to provide alphanumeric information shown on one or more of the displays 100a-100c.

In various embodiments, the electronic control unit 94 generally comprises at least one microcontroller. The at least one microcontroller may include one or more processors, each of which may be embodied as a separate processor, an application specific integrated circuit (ASIC), a field programmable gate array (FPGA), or a dedicated electronic control unit.

The at least one microcontroller may be any sort of electronic processor (implemented in hardware, software executing on hardware, or a combination of both). The at least one microcontroller may also include tangible, non-transitory memory, (e.g., read only memory in the form of optical, magnetic, and/or flash memory). For example, the at least one microcontroller may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be stored in the memory and executed as set forth herein. The executable instructions may be a series of instructions employed to run applications on the at least one microcontroller (either in the foreground or background). The at least one microcontroller may receive commands and information, in the form of one or more input signals from various controls or components in the platform 90 and communicate instructions to the displays 100a-100c through one or more control signals to control the displays 100a-100c.

The displays 100a-100c are generally mounted to the body 92. In various embodiments, one or more of the displays 100a-100c may be disposed inside the platform (e.g., vehicle) 90. In other embodiments, one or more of the displays 100a-100c may be disposed exterior to the platform 90. One or more of the displays 100a-100c may implement a local dimming backlight capability. As illustrated, the display 100a may be a cluster display positioned for use by a driver. The display 100b may be a console display positioned for use by the driver and a passenger. The display 100c may be a passenger display positioned for use by the passenger. Control signals used to generate images on the displays 100a-100c may be received from the electronic control unit 94. The displays 100a-100c and the electronic control unit 94 may form an instrument panel.

Figure 2:
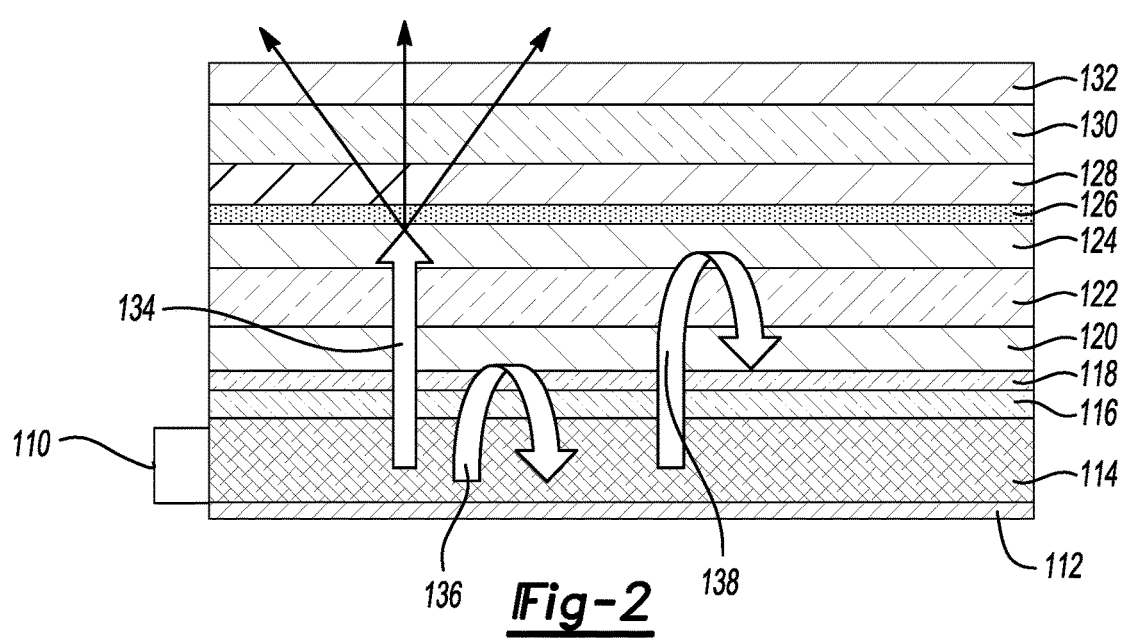
FIG. 2 illustrates a local-dimming display in accordance with one or more embodiments of the platform.

FIG. 2 illustrates an example embodiment of a local-dimming display 100x in accordance with one or more embodiments of the platform 90. The local-dimming display 100x may be representative of each display 100a-100c. The local-dimming display (or circuit) 100x generally comprises a light source 110, a rear reflector 112, a backlight light pipe 114, a rear diffuser 116, one or more brightness enhancement films (BEFs) 118, a rear reflective polarizer 120, a monochrome (or first) display 122, a front reflective polarizer 124, a front diffuser 126, a rear linear dye polarizer 128, a color (or second) display 130 and a front linear dye polarizer 132.

The light source 110 may be implemented as one or more light emitting diodes. The light source 110 is generally operational to present light into the backlight light pipe 114 along one or more edges. The backlight light pipe 114 is generally operational to spread the light received from the light source 110 over an area of the local-dimming display 100x.

Some light presented from the backlight light pipe 114 may be driven-pixel backlight 134 that is passed through the monochrome display 122. Some light may be incorrect-polarization backlight 136 that is recycled back toward the backlight light pipe 114 by the rear reflective polarizer 120. Still other backlight may be undriven-pixel backlight 138 that may be rotated and reflected back toward the backlight light pipe 114 by the front reflective polarizer 124 for recycling.

Due to developments in current reflective polarizer technology, the two reflective polarizers 120 and 124 may be used in conjunction with the monochrome display 122 (e.g., a monochrome thin-film-transistor display) to produce a local dimming backlight with relatively high optical efficiency. A variation of the optical system may not include the front reflective polarizer 124 and/or the front diffuser 126. Although a system efficiency may be reduced by removing the front reflective polarizer 124, the efficiency of the system may be sufficient with only the rear reflective polarizer 120. Additionally, the front diffuser 126 may be removed if other moiré interference removal methods are utilized thus affording additional improvements in the system efficiency. However, if the front diffuser 126 is removed or reduced in diffusion performance, a Gaussian intensity pattern (or function) or other similar smoothing intensity pattern, may be employed on monochrome (or first) pixels of the monochrome display 122 so that an observer (or user) does not notice a sharp demarcation of the monochrome on-to-off transition behind color (or second) pixels of the color display 130.

A basic operating principle is that transmission axes of the two reflective polarizers 120 and 124 are aligned with a transmission axis of the rear linear dye polarizer 128 on the back side of the color display 130 (e.g., a color thin-film-transistor display). Suppose that the monochrome display 122 is configured to rotate polarized light by 90 degrees in the undriven state and to not rotate the polarized light in the driven state. In the driven state, polarized light (e.g., the driven-pixel backlight 134) travels through both reflective polarizers 120 and 124 and through the rear linear dye polarizer 128 on the back of the color display 130 to be utilized by the color display 130 to produce a color image.

In the undriven state, the polarized light travelling through the rear reflective polarizer 120 is rotated by 90 degrees by the monochrome display 122. The rotated light (e.g., the undriven-pixel backlight 138) may be reflected by the front reflective polarizer 124 and rotated back into the backlight light pipe 114 through the rear reflective polarizer 120 to be recycled for use. Any light presented by the backlight light pipe 114 that does not have an appropriate polarization (e.g., the incorrect-polarization backlight 136) may be reflected by the rear reflective polarizer 120 back into the backlight light pipe 114.

Since the monochrome display 122 is pixelated, each monochrome pixel may be dynamically configured to either rotate or not rotate the polarized light thereby producing a local dimming backlight at the monochrome pixel level at multiple transmission levels (e.g., $2^N$ transmit levels for an N-bit control per pixel). Using a monochrome display 122 with a lower resolution than the color display 130 may lead to improvements in efficiency because an aperture ratio of the monochrome pixels (or cells) may be improved as the resolution is decreased. If all the layers 120-132 are laminated together and aligned at the pixel level, local zones are generally produced by the monochrome display 122 that may be, for instance, larger by a factor (e.g., an integer factor of 2 to 4) than color pixels in the color display 130 to account for alignment tolerances. The factor generally leads to a constrained halo zone that may be difficult to see due to the luminance of the adjacent transmitting monochrome pixel(s).

The front diffuser 126 may reduce moiré effects (e.g., interference patterns) due to intermodulation visual effects of the two thin-film-transistor structures of the monochrome display 122 and the color display 130. However, the front diffuser 126 and/or the rear diffuser 116 may reduce the effective transmission of the local-dimming display 100x (e.g., by up to 30 percent). Therefore, in various embodiments, the front diffuser 126 and/or the rear diffuser 116 may be eliminated or reduced in diffusion. In some designs, a design of the row and column lines in the monochrome display 122 and the color display 130 may be changed to eliminate the moiré effect. However, the softened edges of the monochrome lit pixels may become sharper and more noticeable due to the change.

The color display 130 generally comprises a matrix of color pixels. The color pixels may be controlled to transmit the light received from the monochrome display 122 at a variety of transmission levels (e.g., $2^N$ transmit levels for an N-bit control per pixel). In various embodiments, the color display 130 may have more color pixels per inch than the monochrome pixels in the monochrome display 122.

Various embodiments generally provide an algorithm to soften a transition of the lit color pixels to a dark surrounding by providing a gradual backlight transition. The gradual backlight transition may utilize a gray shade capability of the monochrome display 122. As part of the algorithm, a parallax analysis was performed to determine a number of the monochrome pixels that may be controlled around a lit color pixel to properly illuminate the lit color pixel under extreme viewing angle criteria.

Figure 3:
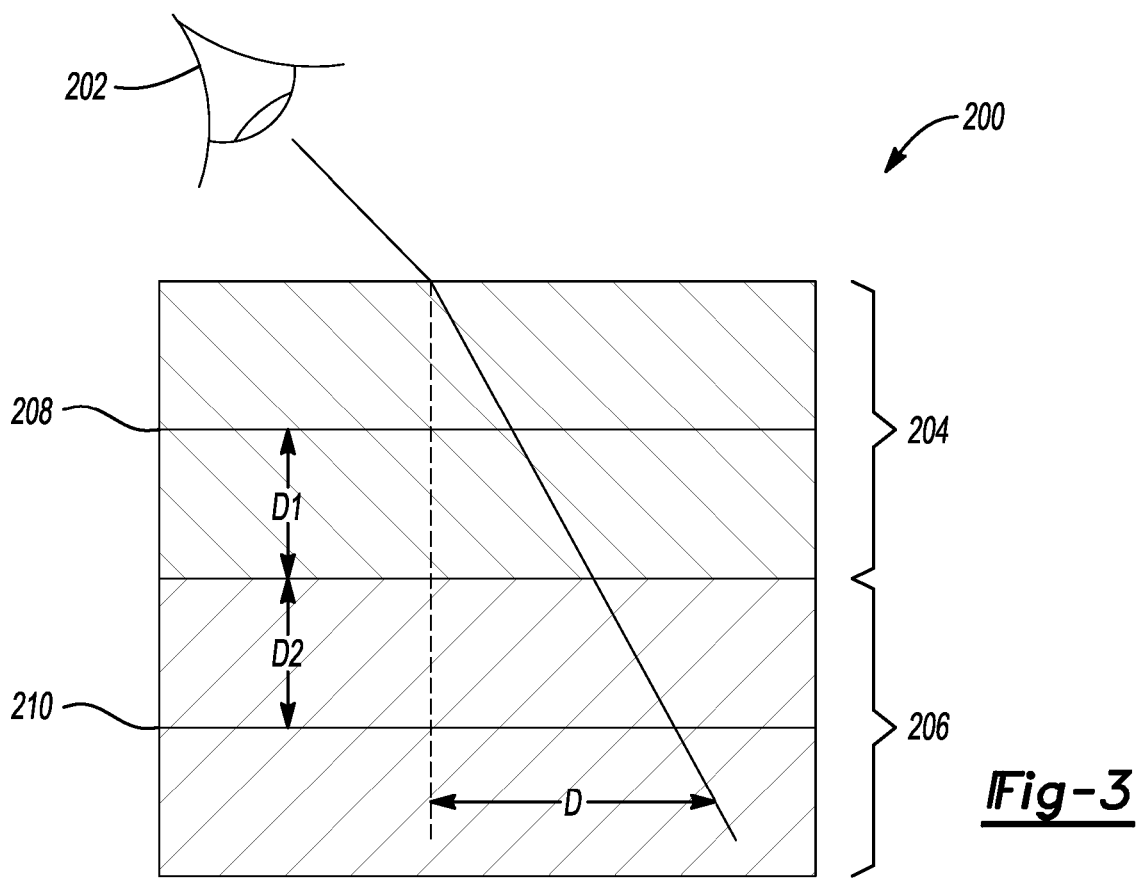
FIG. 3 illustrates a parallax diagram in accordance with one or more embodiments of the platform.

FIG. 3 illustrates an example parallax diagram 200 in accordance with one or more embodiments of the platform 90. An observer (e.g., a person) 202 may view a display (e.g., the local-dimming display 100x) from a direction other than normal to a front surface of the display. The local-dimming display 100x may be representative of the displays 100a-100c. The parallax diagram 200 generally comprises a color thin-film-transistor display 204 and a monochrome thin-film-transistor display 206. The color thin-film-transistor display 204 may include a color liquid crystal layer 208 having a matrix of color pixels. The monochrome thin-film-transistor display 206 may include a monochrome liquid crystal layer 210 having another matrix of monochrome pixels.

A number of nearest neighboring monochrome pixels of the monochrome thin-film-transistor display 206 in a given range (e.g., D) that should to be turned on behind a single color pixel of the color thin-film-transistor display 204 generally depends on glass thicknesses (e.g., D1 and D2) that are used for both the color thin-film-transistor display 204 and the monochrome thin-film-transistor display 206. The range D may vary depending on a separation between the color liquid crystal layer 208 and the monochrome liquid crystal layer 210.

Figure 4:
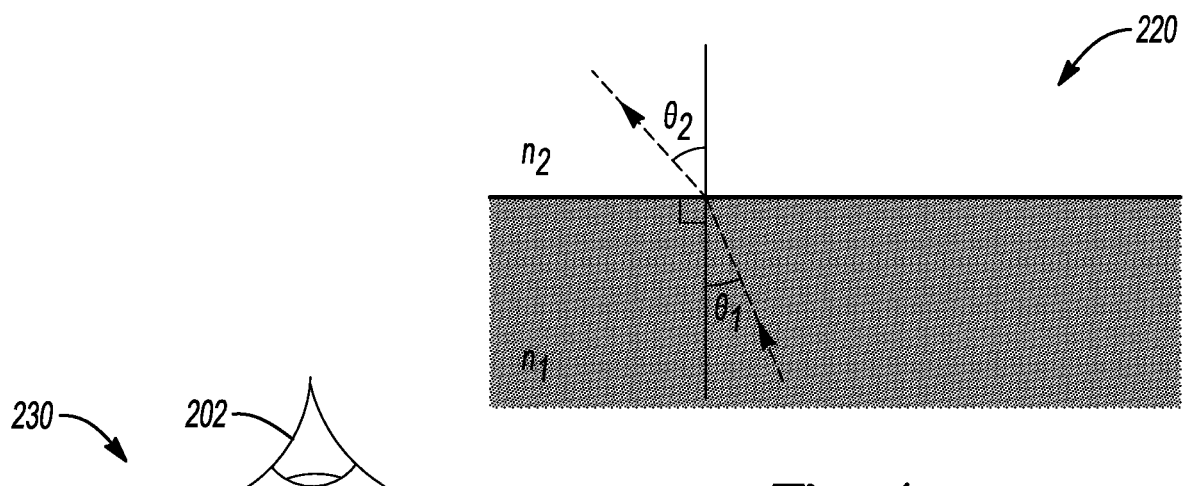
FIG. 4 illustrates a graph that shows Snell's law in accordance with one or more embodiments of the platform.

FIG. 4 illustrates an example graph 220 that shows Snell's law in accordance with one or more embodiments of the platform 90. The optical material (e.g., glass) used to fabricate a thin-film-transistor display (e.g., the color thin-film-transistor display 204 and/or the monochrome thin-film-transistor display 206) may have a first index of refraction (e., $n_1$). The air outside of the thin-film-transistor display may have a second index of refraction (e.g., $n_2$). Light traveling through the thin-film-transistor display may be at an angle (e.g., $\theta_1$) relative to a normal to a front surface (e.g., the surface facing the observer 202) of the thin-film-transistor display. The light traveling through the air may be at an angle ($\theta_2$) relative to the normal for the front surface. Snell's law generally states that a ratio of the angles $\theta_1/\theta_2$ matches a ratio of the indices of refraction $n_2/n_1$.

Consider a typical an index of refraction (e.g., $n_1$) of about 1.54 for a typical thin film transistor glass structure and about 1 for the air. Applying Snell's law at a viewing angle (e.g., $\theta_2$) of 60 degrees, the angle $\theta_1$ may be determined to be 34 degrees according to equation 1 as follows:

$$\theta_1 = \sin^{-1}\left(\frac{1\sin(60°)}{1.54}\right) = 34° \qquad (1)$$

For example, if the glass thicknesses D1 and D2 are each 0.5 millimeters (mm), the range D may be 0.67 mm for the 60-degree viewing angle $\theta_2$ according to equation 2 as follows:

$$D=(D1+D2)\operatorname{Tan}(34°)=0.67 \text{ mm} \qquad (2)$$

Consider a large (e.g., 12.3 inch diagonal) color thin-film-transistor display having a pixel pitch of several hundred (e.g., 200) pixels per inch (ppi). At a particular pixel area ratio (e.g., a 1:4 pixel area ratio), the pixels per inch for the monochrome thin-film-transistor display may be 200/2=100 ppi. For a 100 pixels per inch monochrome thin-film-transistor display, the pixel pitch is generally given by equation 3 as follows:

$$\Delta x_{pitch} = \frac{25.4 \text{ mm/in}}{100 \; ppi} = 0.254 \text{ mm} \qquad (3)$$

In order to have the 60-degree viewing angle $\theta_2$, a number (N) of nearest neighboring monochrome pixels that should be turned on may be determined by equation 4 as follows:

$$N = \frac{0.67 \text{ mm}}{0.254 \text{ mm}} = 2.64 \quad (4)$$

Rounding the number of nearest neighboring monochrome pixels N=2.64 up to a nearest integer, at least 3 of the nearest neighboring monochrome pixels may be turned on to see the image at the viewing angle of 60 degrees. Thinner glass thickness generally reduces the number of nearest neighboring monochrome pixels. Changing a resolution of the monochrome thin film transistor display to increase the pixel pitch may be another option to reduce the number of nearest neighboring monochrome pixels.

Figure 5:
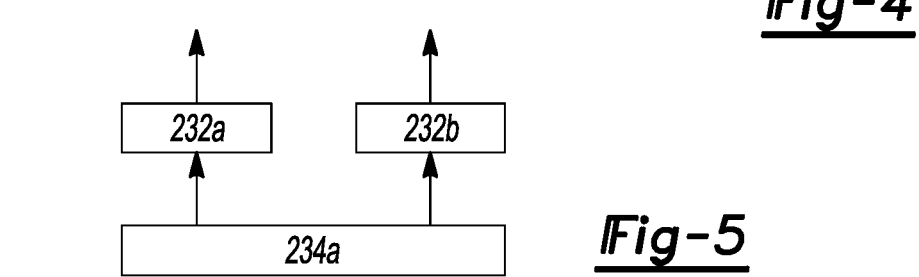
FIG. 5 illustrates a portion of a first display in accordance with one or more embodiments of the platform.

FIG. 5 illustrates an example portion of a first display 230 in accordance with one or more embodiments of the platform 90. The first display 230 may be viewed by the observer 202 from perpendicular to the surface of the first display 230. The first display 230 is illustrated as multiple (e.g., 2 illustrated) color pixels 232a-232b and multiple (e.g., 1 illustrated) monochrome pixels 234a. Light emitted through the monochrome pixel 234a in the drive state (e.g., turned on) may back illuminate both color pixels 232a-232b. If one or both color pixels 232a-232b are in the driven state (e.g., turned on), the light may pass out of the first display 230 and to the observer 202.

Figure 6:
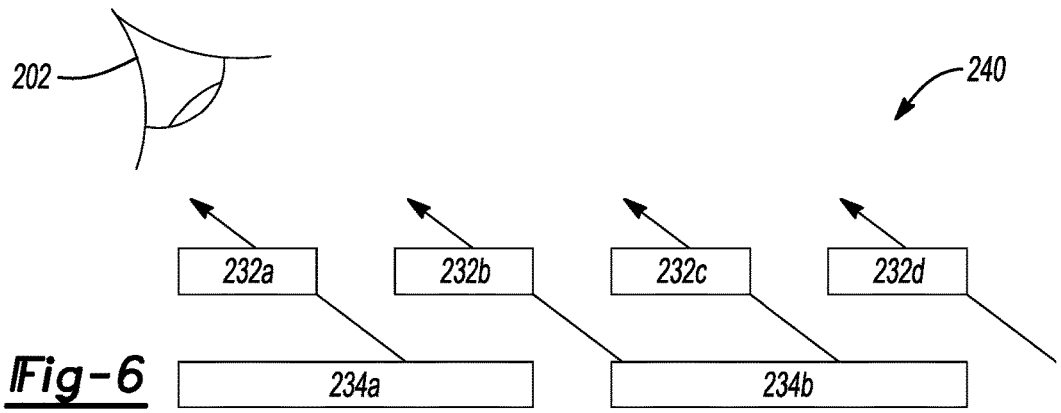
FIG. 6 illustrates a portion of a second display in accordance with one or more embodiments of the platform.

FIG. 6 illustrates another example portion of a second display 240 in accordance with one or more embodiments of the platform 90. The second display 240 may be viewed by the observer 202 from a non-normal angle to the surface of the second display 240. The second display 240 is illustrated as multiple (e.g., 4 illustrated) color pixels 232a-232d and multiple (e.g., 2 illustrated) monochrome pixels 234a-234b. Backlight passing through the monochrome pixel 234b in the drive state may back illuminate the color pixel 232b from the viewing angle of the observer 202 even though the color pixel 232b is aligned with the monochrome pixel 234a. Likewise, the color pixel 232d may be illuminated by another monochrome pixel neighboring the monochrome pixel 234b.

Figure 7:
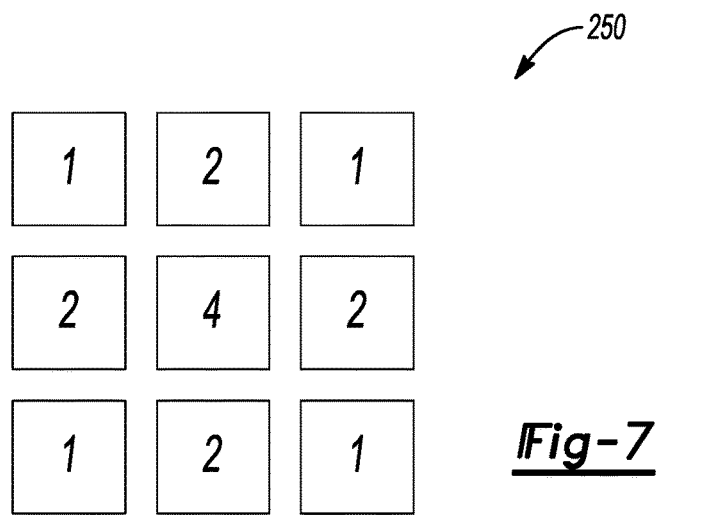
FIG. 7 illustrates an N×N Gaussian kernel in accordance with one or more embodiments of the platform.

FIG. 7 illustrates an example N×N Gaussian kernel in accordance with one or more embodiments of the platform 90. The N×N Gaussian kernel may be illustrated as a 3×3 Gaussian kernel 250.

In order to smooth the edges of the monochrome pixels that are turned on to provide the backlighting to the color pixels, a Gaussian type convolution may be applied to monochrome black to white transitions. Generally, in the image processing realm, the convolution may be implemented with a Gaussian kernel. As an example, a Gaussian kernel with a 3×3 size may be formed as shown in the figure. Image processing kernels are generally 3×3 or 5×5 in size. Other image processing kernels may be implemented to meet the design criteria of a particular application.

Figure 8:
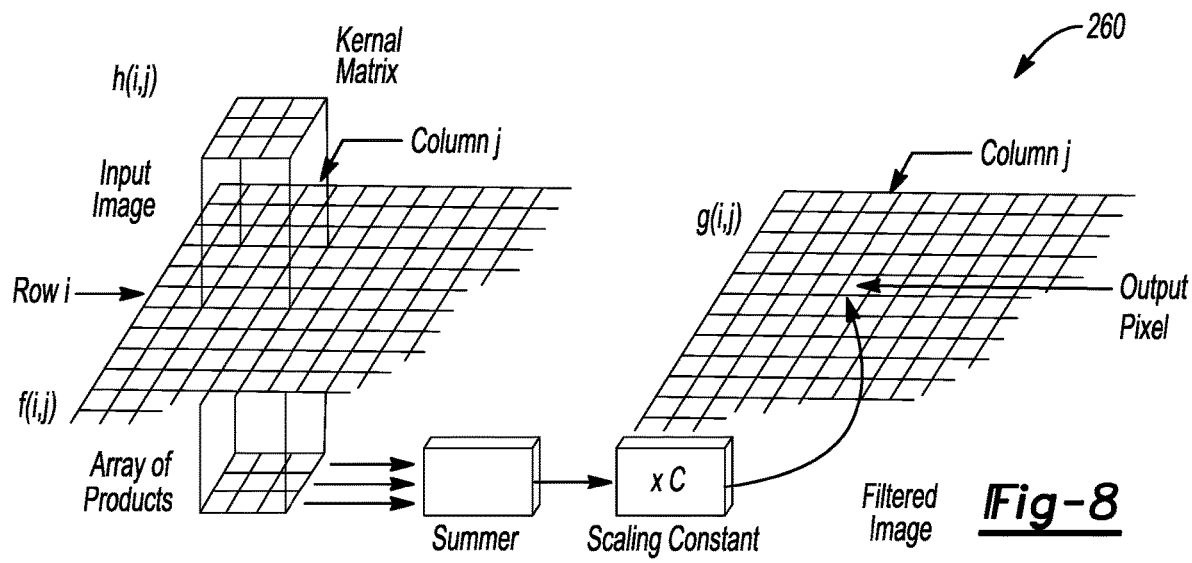
FIG. 8 illustrates a kernel correlation process in accordance with one or more embodiments of the platform.

FIG. 8 illustrates an example kernel correlation process 260 in accordance with one or more embodiments of the platform 90. A Gaussian kernel (or mask) convolution process generally involves generating a filtered image from an original image by applying the kernel correlation process 260. The kernel correlation process 260 may be performed for every pixel in the input image to form the output image.

The filtered image (e.g., output image) may be generated as a center of an N×N kernel mask visits every pixel in the input image. Arrays of products may be formed by the visits. The kernel correlation process 260 generally multiplies all of the original image cell values (e.g., f(i,j)) by the mask values (e.g., h(i,j)). The products may be subsequently summed. The sums may be scaled by a constant (e.g., C) to calculate the output pixels (e.g., g(i,j)) in the filtered image. The output pixels may be determined by equation 5 as follows:

$$g(i, j) = C \sum_{k=-n/2}^{n/2} \sum_{l=-n/2}^{n/2} h(k, l) f(i + k, j + l) \quad (5)$$

Figure 9:
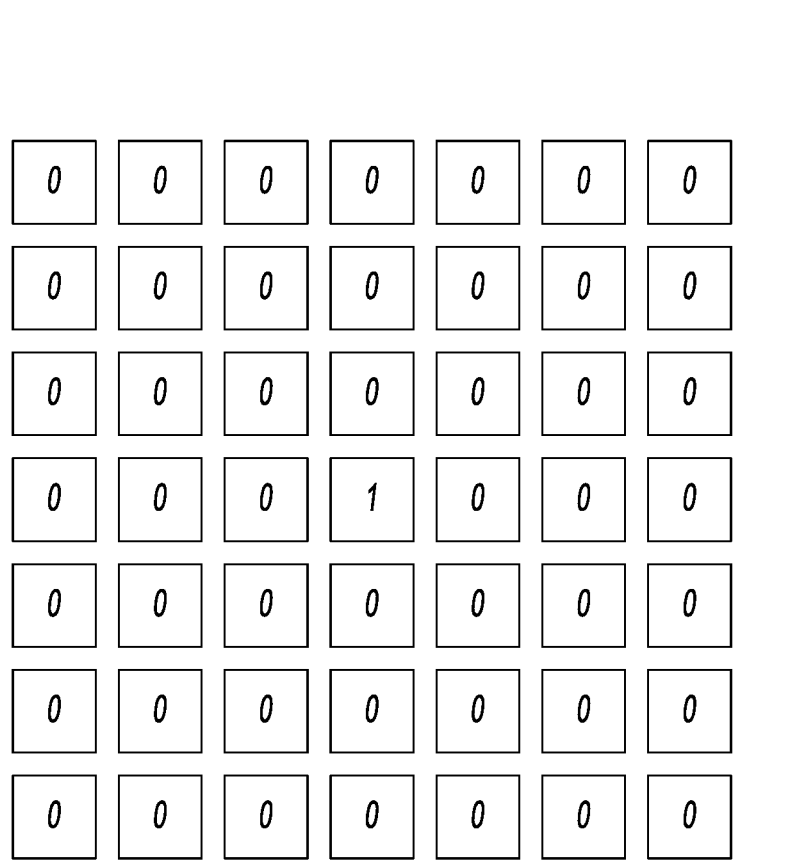
FIG. 9 illustrates a first input impulse image in accordance with one or more embodiments of the platform.

FIG. 9 illustrates an example first input impulse image 270 in accordance with one or more embodiments of the platform 90. By way of example, the first input impulse image 270 may implement an impulse image having a central input pixel that is "on", illustrated as a unit value (e.g., one), and all surrounding pixels are "off", illustrated as having null values (e.g., zero).

Figure 10:
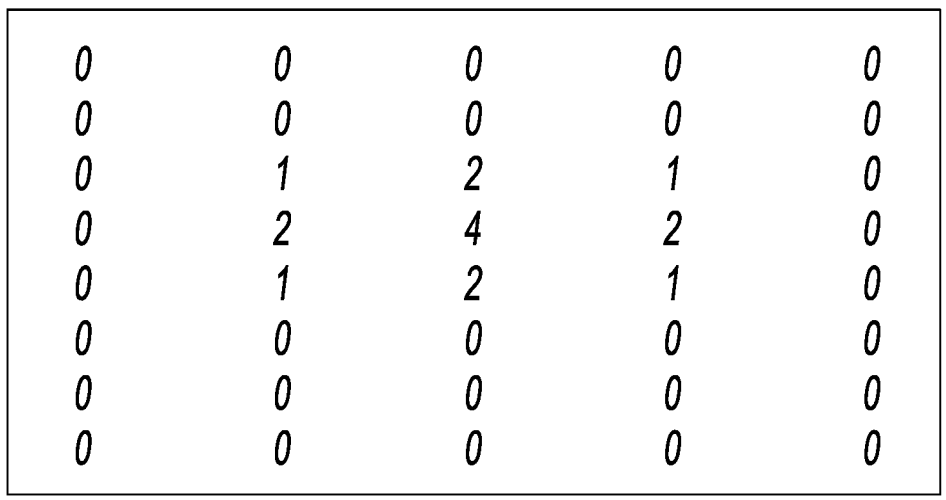
FIG. 10 illustrates a first filtered output image in accordance with one or more embodiments of the platform.

FIG. 10 illustrates an example first filtered output image 280 in accordance with one or more embodiments of the platform 90. Using the first input impulse image 270 of FIG. 9 as an impulse function and applying the 3×3 Gaussian kernel 250 per FIG. 7, the first filtered output image 280 may be created. Note that the first filtered output image 280 results in the original 3×3 Gaussian kernel 250 which shows an edge smoothing function (e.g., a declining intensity pattern). However, a sum of the values in the first filtered output image 280 (e.g., 1+2+1+2+4+2+1+2+1=16) matches the sum of the values in the 3×3 Gaussian kernel 250 (e.g., 1+2+1+2+4+2+1+2+1=16).

As illustrated, the central value may be 1÷(4/16)=4. Therefore, the central value may be scaled to restore the original value of unity. Normally, the filtered output image may be scaled by dividing the results by the sum of the kernel values. After scaling, the first filtered output image 280 may form a mask used to control the monochrome pixels in the monochrome display 122 to backlight a central color pixel in the color display 130. The central value in the mask applied to the monochrome display 122 may be aligned with and provide some of the backlight for the central color pixel in the color display 130. Therefore, the central value in the mask may be referred to as an aligned pixel in the monochrome display 122. The other monochrome pixels in the mask may provide a remainder of the backlight for the central color pixel.

Figure 11:
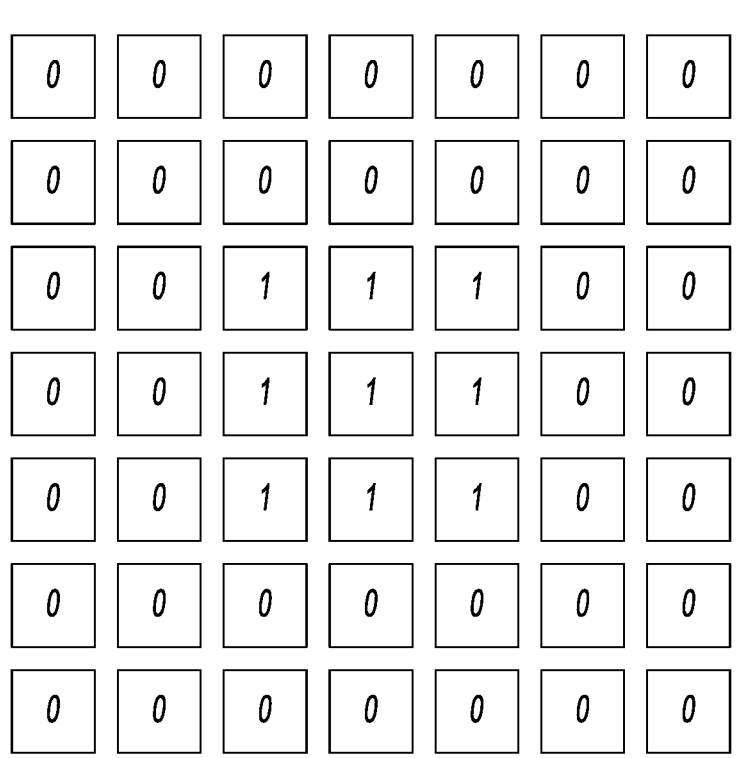
FIG. 11 illustrates a second input image surrounded by buffer pixels in accordance with one or more embodiments of the platform.

FIG. 11 illustrates an example second input image 290 surrounded by buffer pixels in accordance with one or more embodiments of the platform 90. In order not to affect the central value for the monochrome thin-film-transistor display, an additional buffer of "on" pixels may be used around the desired image pixels. In the illustration, the central pixel and eight adjoining pixels (e.g., one pixel distance from the center) may be "on" while the remining pixels may be "off".

Figure 12:
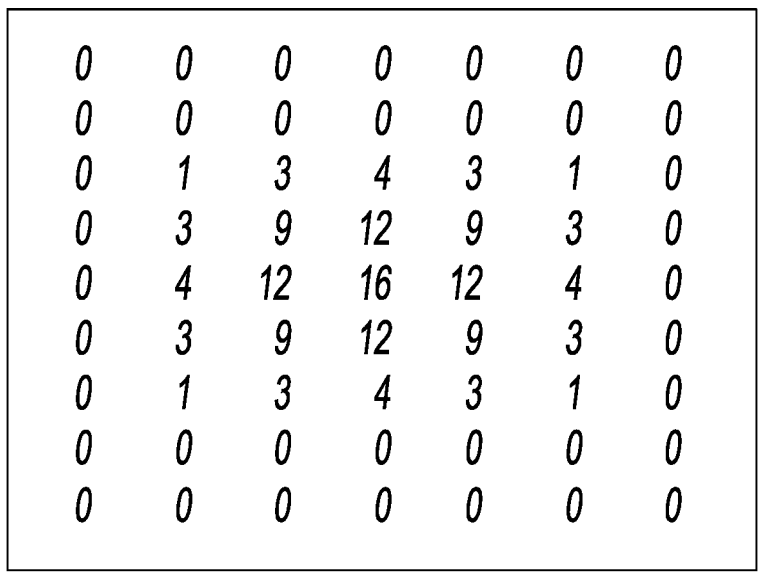
FIG. 12 illustrates a second filtered output image in accordance with one or more embodiments of the platform.

FIG. 12 illustrates an example second filtered output image 300 in accordance with one or more embodiments of the platform 90. Applying the 3×3 Gaussian kernel 250 to the second input image 290 generally results in the second filtered output image 300. The second filtered output image 300 may have a broader (both horizontally and vertically) distribution of non-zero values away from the central value. The buffer "on" pixels in the second input image 290 may increase the value of the central pixel in the second filtered output image 300.

FIG. 13 illustrates an example normalized filtered output image 310 with buffered pixels in accordance with one or more embodiments of the platform 90. Scaling the second filtered output image 300 by division with the sum of the values in the 3×3 Gaussian kernel 250 (e.g., the value 16) may create the normalized filtered output image 310. The central value of the normalized filtered output image 310 may match the central value of the second input image 290 and the Gaussian tapering begins around the central pixel value. The normalized filtered output image 310 may form a mask used to control the transmit levels of the monochrome pixels in the monochrome display 122 to backlight a corresponding color pixel in the color display 130.

Figure 14:
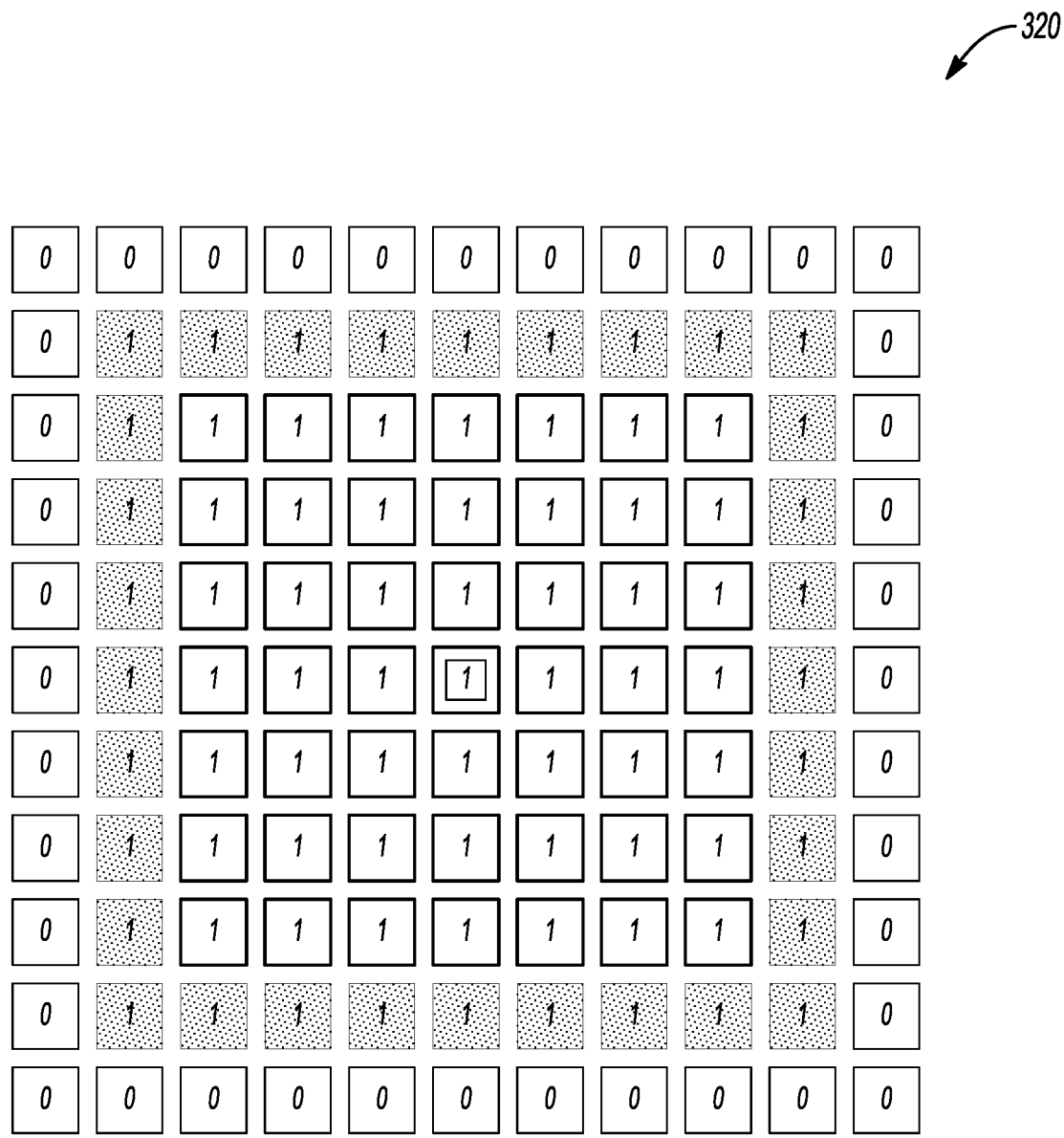
FIG. 14 illustrates a third input image with parallax pixel buffers in accordance with one or more embodiments of the platform.

FIG. 14 illustrates an example third input image 320 with parallax pixel buffers in accordance with one or more embodiments of the platform 90. For a 3×3 kernel, a single buffer pixel distance around a central pixel may be implemented. A 5×5 kernel may implement two buffer pixel distances around the central pixel. For larger kernels, larger corresponding buffer pixel distances may be implemented.

Using a 2:1 monochrome-to-color pixel ratio, an active (e.g., a non-zero transmit level) central color pixel centered on the third input image 320 may occupy one-fourth (e.g., ½×½) of an area of a co-aligned "on" central monochrome pixel. The central monochrome pixel may be surrounded in each direction by 3 "on" monochrome parallax buffer pixels that provide a 7×7 array background light around the active central color pixel for parallax viewing. In addition, a rule may be employed to add another layer of "on" monochrome buffer pixels (e.g., the shaded "on" pixels) around the parallax pixels to create a 9×9 array background light. The buffer pixels may be used to ensure that the transmission levels of the parallax pixels are not decreased by the smoothing kernel. Furthermore, an additional layer of "off" monochrome buffer pixels with values of zero may be included in the third input image 320 to complete the buffer at an 11×11 array of monochrome pixels.

Figure 15:
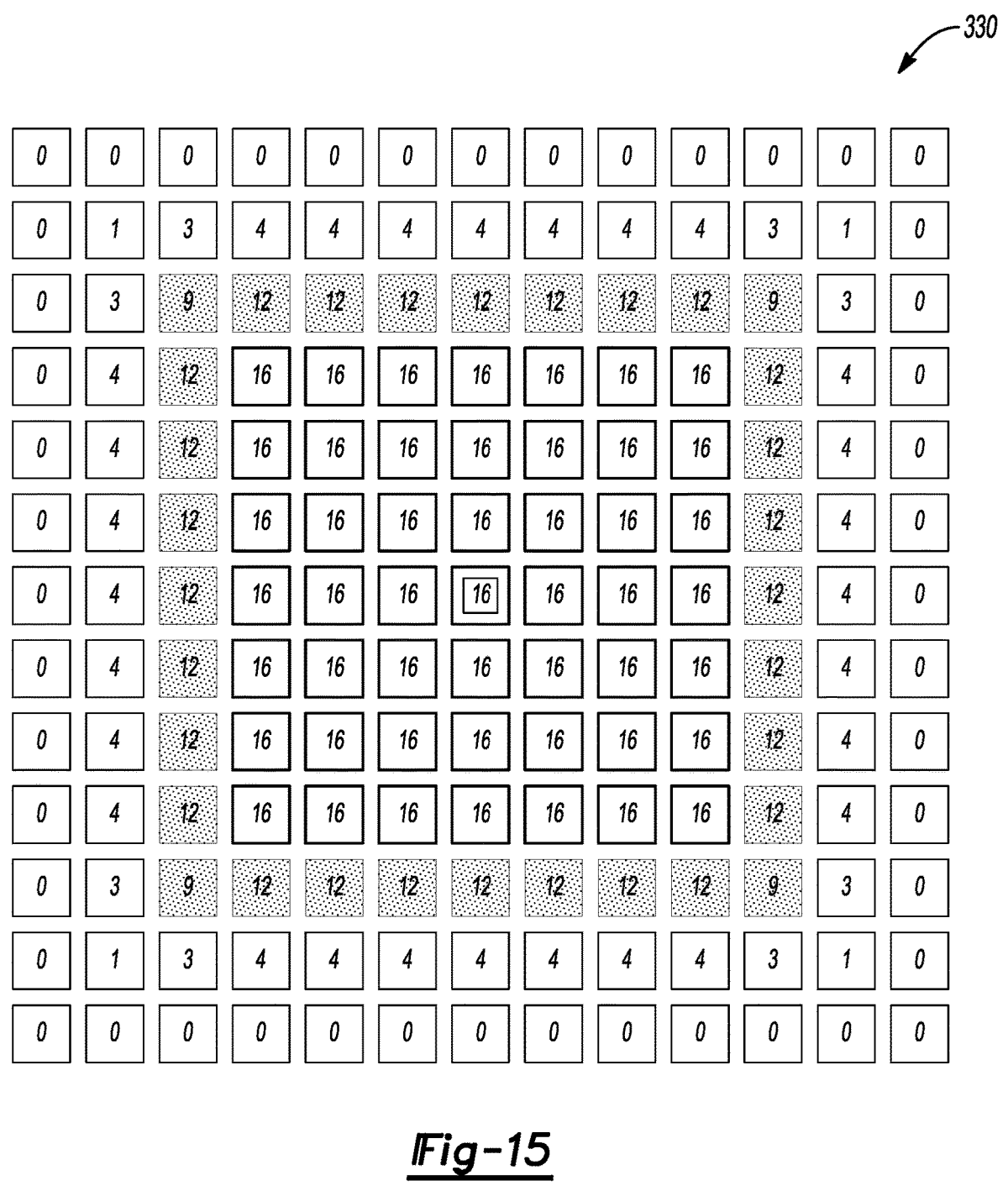

FIG. 15 illustrates an example third filtered output image 330 with parallax pixels in accordance with one or more embodiments of the platform 90. When the kernel correlation process 260 in FIG. 8 is performed on the third input image 320 with the 3×3 Gaussian kernel 250 per FIG. 7, the resulting output pixel values (without division by 16) are shown in the third filtered output image 330. The parallax pixels (the 7×7 array of "on" pixels within the ring of shaded pixels) in the third filtered output image 330 may be remain consistent (e.g., all have the full "on" value of 16 prior to the division). The third filtered output image 330 generally shows that the Gaussian tapering of the monochrome pixels (e.g., second transmission levels) starts at an outside edge of the parallax pixels (e.g., first transmission levels) where the shaded pixels transmission at lesser values (e.g., values of 12 and 9). The Gaussian tapering generally continues into the next outer ring of pixels where even smaller values are calculated. After normalization (division), the third filtered output image 330 may be used as a mask to control the transmit levels of the monochrome pixels in the monochrome display 122 to backlight the corresponding active color pixel in the color display 130.

Figure 16:
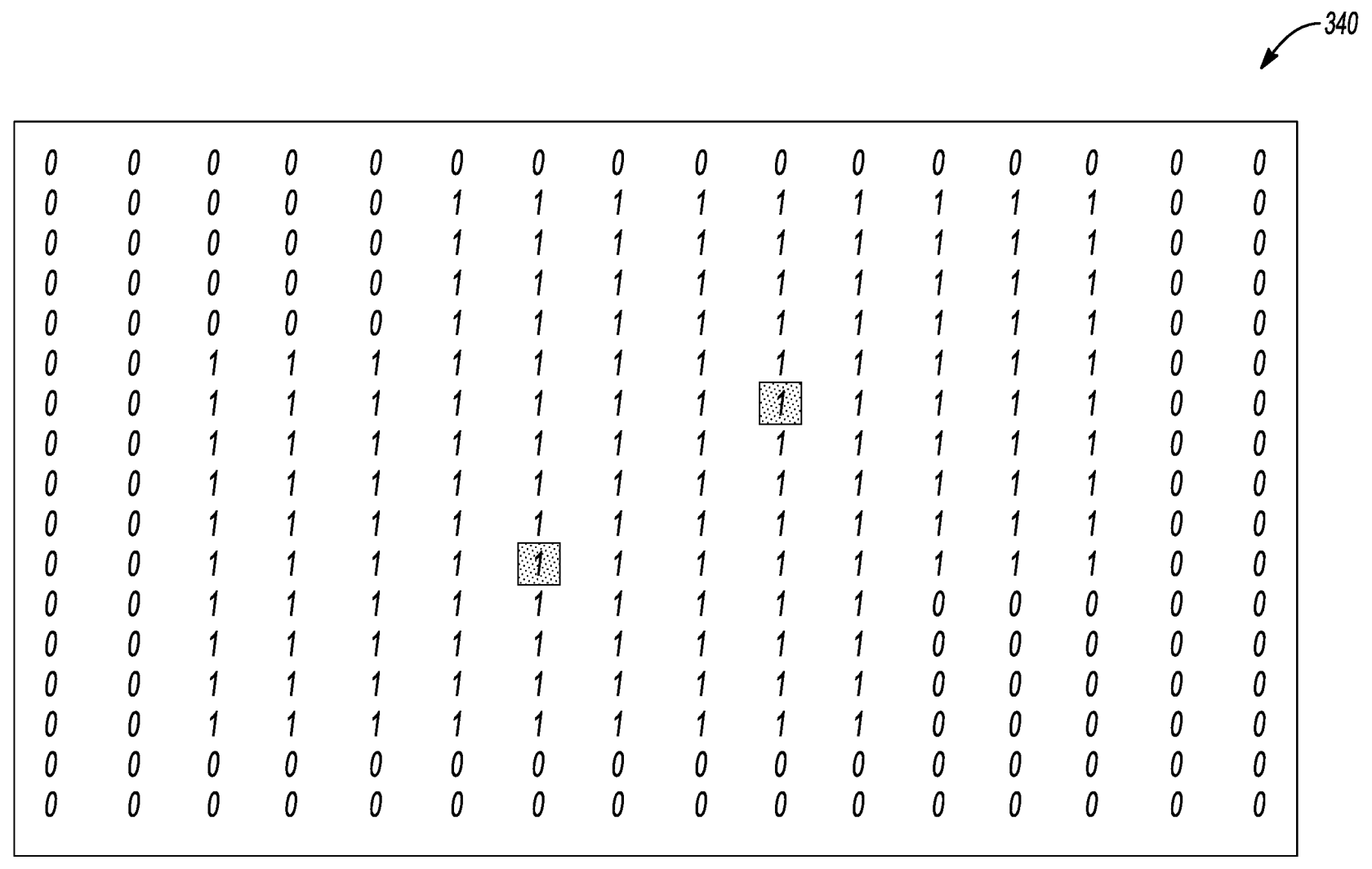

FIG. 16 illustrates an example fourth input image 340 in accordance with one or more embodiments of the platform 90. The fourth input image 340 generally comprises two "on" monochrome pixels surrounded by 3 parallax pixels and one buffer pixel. Locations of the two "on" monochrome pixels in the example are illustrated as shaded boxes and align with two active color pixels. Individual rings of 3 "on" parallax pixels, the ring of "on" buffer pixels and an outer boundary of one "off" pixels generally established the 11×11 third input image 320 centered around each of the two shaded locations. Overlaps of the two 11×11 third input images 320 may result in pixel values within the fourth input image 340 that are the highest of the pixels values in the two overlapping 11×11 third input images 320.

The example forms a basis for the backlighting algorithm. If for example, there are two active color pixels in the image separated by some number of the monochrome pixels, the input image may be modified as shown in the fourth input image 340 where the shaded pixels are associated with the active color pixels that have a non-zero luminance value. Note that the color pixels are surrounded in each direction by 3 "on" parallax pixels plus the "on" buffer pixel.

Figure 17:
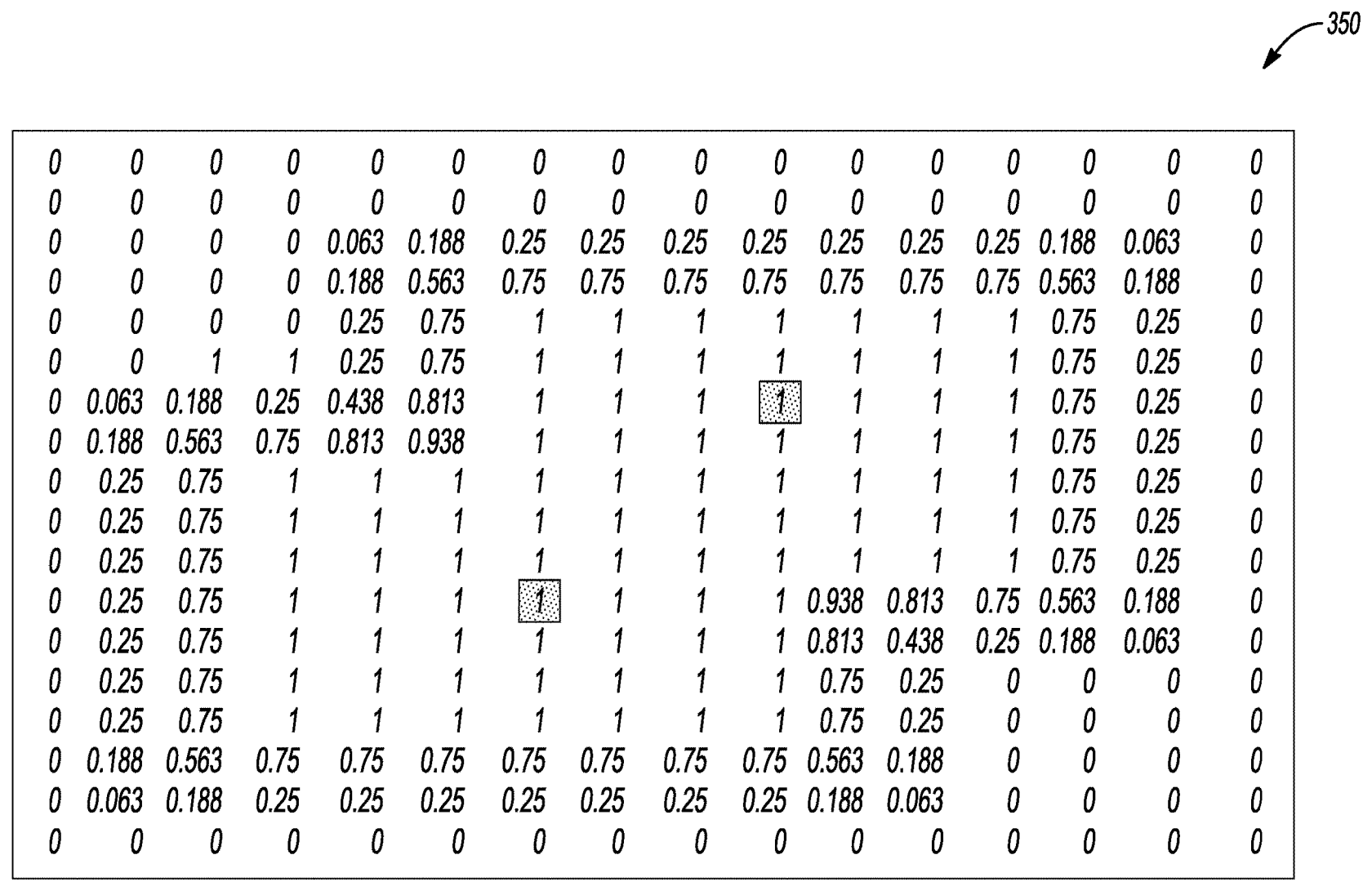

FIG. 17 illustrates an example fourth filtered output image 350 in accordance with one or more embodiments of the platform 90. When the kernel correlation process 260 in FIG. 8 is performed on the fourth input image 340 with the 3×3 Gaussian kernel, the resulting output pixel values (with the normalizing division by 16 operation) are shown in the fourth filtered output image 350.

FIG. 18 illustrates an example vertical one-dimensional Gaussian kernel 360 in accordance with one or more embodiments of the platform 90. FIG. 19 illustrates an example horizontal one-dimensional Gaussian kernel 370 in accordance with one or more embodiments of the platform 90.

The Gaussian convolution function may be "separable", which means that the convolution may be determined in two steps with less mathematical operations. The two separate one-dimensional kernels 360 and 370 associated with the Gaussian kernel may be applied in any order. For example, the vertical one-dimensional Gaussian kernel 360 may be applied first and the horizontal one-dimensional Gaussian kernel 370 applied second, or vice versa. Other separable and/or non-separable smoothing transitions may be implemented to meet the design criteria of a particular application.

Conceptually, the steps to develop the monochrome image prior to applying a display gamma function may be simple. Initially, identify all of the color pixels that have an active non-zero value (red, green and blue). Subsequently, map the identified color pixels into the monochrome pixel field with an N:1 (e.g., 2:1) color-to-monochrome pixel ratio and assign the "on" value (e.g., one) for the "central" monochrome pixels associated with the identified color pixels. Next, assign the "on" value for a field of several (e.g., 3 parallax and 1 buffer) monochrome pixel rows/columns surrounding the central monochrome pixels with the "on" value. Assign the "off" value (e.g., zero) for the remaining monochrome pixels to establish an input image.

The convolution kernel may be applied to the monochrome matrix and subsequently divided by a normalizing value (e.g., 16) to generate a normalized output image. The monochrome gray shade (or transmit) levels may be determined by multiplying the normalized output image by a maximum number of monochrome gray shades (or transmit level) available in the monochrome display 122 (e.g., 256 gray shades for an 8-bit monochrome display). Finally, the color image may be presented to the color display 130 and the associated monochrome image may be simultaneously presented to the monochrome display 122.

The application of the parallax pixels and buffer pixels, and the use of a Gaussian or other convolution kernel generally provides the appropriate gray shade values for the monochrome display 122. The method may provide for a declining intensity pattern (or smoothing function) around the "on" monochrome pixels so that the black to white transitions are less noticeable.

The foregoing detailed description and the drawings are supportive and descriptive of the disclosure, but the scope of the disclosure is defined solely by the claims. As will be appreciated by those of ordinary skill in the art, various alternative designs and embodiments may exist for practicing the disclosure.

The invention claimed is:

1. A local-dimming display, comprising:
a light source configured to generate a backlight;
a first display aligned with the light source and having a plurality of first pixels, wherein each of the plurality of first pixels is configured to selectively pass and block the backlight; and
a second display aligned with the first display and having a plurality of second pixels, wherein:
a particular pixel of the plurality of second pixels is controlled to pass the backlight;
the particular pixel corresponds with an aligned pixel of the plurality of first pixels, a plurality of parallax pixels of the plurality of first pixels, and a plurality of neighboring pixels of the plurality of first pixels;
the aligned pixel is controlled to pass the backlight at a first transmit level;
the plurality of parallax pixels are controlled to pass the backlight at the first transmit level and forms at least a 7×7 array that completely surrounds the aligned pixel;
the plurality of neighboring pixels are controlled to pass the backlight at one or more second transmit levels and completely surround the plurality of parallax pixels;
the one or more second transmit levels are less than or equal to the first transmit level; and
the plurality of the first pixels cooperating at the first transmit level and the one or more second transmit levels selectively present the backlight to the second display with a declining intensity pattern in the plurality of neighboring pixels.

2. The local-dimming display according to claim 1, wherein the declining intensity pattern comprises a Gaussian tapering in the one or more second transmit levels.

3. The local-dimming display according to claim 1, wherein a plurality of buffer pixels of the plurality of first pixels are:
disposed between the plurality of parallax pixels and the plurality of neighboring pixels; and
controlled to the one or more second transmit levels.

4. The local-dimming display according to claim 3, wherein the declining intensity pattern extends through the plurality of buffer pixels.

5. The local-dimming display according to claim 1, wherein:
a second particular pixel of the plurality of second pixels controlled to pass the backlight corresponds with a second aligned pixel of the plurality of first pixels at the first transmit level, a plurality of second parallax pixels of the plurality of first pixels at the first transmit level, and a plurality of second neighboring pixels of the plurality of first pixels at the one or more second transmit levels;
the plurality of second parallax pixels completely surround the second aligned pixel; and
the plurality of second neighboring pixels completely surround the plurality of second parallax pixels.

6. The local-dimming display according to claim 5, where one or more overlapping pixels of the plurality of first pixels are set to the first transmit level due to the particular pixel instead of being set to the one or more second transmit levels due to the second particular pixel.

7. The local-dimming display according to claim 5, where one or more overlapping pixels of the plurality of first pixels are set to a highest of two different levels of the one or more second transmit levels due to both the particular pixel and the second particular pixel.

8. The local-dimming display according to claim 1, wherein the first display is a monochrome display and the plurality of first pixels are a plurality of monochrome pixels.

9. The local-dimming display according to claim 1, wherein the second display is a color display and the plurality of second pixels are a plurality of color pixels.

10. An instrument panel comprising:
an electronic control unit; and
a plurality of displays in electrical communication with the electronic control unit, wherein at least one of the plurality of displays includes:
a light source configured to generate a backlight;
a monochrome display aligned with the light source and having a plurality of monochrome pixels, wherein each of the plurality of monochrome pixels is configured to selectively pass and block the backlight; and
a color display aligned with the monochrome display and having a plurality of color pixels, wherein:
a particular pixel of the plurality of color pixels is controlled to pass the backlight;
the particular pixel corresponds with an aligned pixel of the plurality of monochrome pixels, a plurality of parallax pixels of the plurality of monochrome pixels, and a plurality of neighboring pixels of the plurality of monochrome pixels;
the aligned pixel is controlled to pass the backlight at a first transmit level;
the plurality of parallax pixels are controlled to pass the backlight at the first transmit level and forms at least a 7×7 array that completely surrounds the aligned pixel;
the plurality of neighboring pixels are controlled to pass the backlight at one or more second transmit levels and completely surround the plurality of parallax pixels;
the one or more second transmit levels are less than or equal to the first transmit level; and
the plurality of the monochrome pixels cooperating at the first transmit level and the one or more second transmit levels selectively present the backlight to the color display with a declining intensity pattern in the plurality of neighboring pixels.

11. The instrument panel according to claim 10, wherein the declining intensity pattern comprises a Gaussian tapering in the one or more second transmit levels.

12. The instrument panel according to claim 10, wherein a plurality of buffer pixels of the plurality of monochrome pixels are:
disposed between the plurality of parallax pixels and the plurality of neighboring pixels; and
controlled to the one or more second transmit levels.

13. The instrument panel according to claim 12, wherein the declining intensity pattern extends through the plurality of buffer pixels.

14. The instrument panel according to claim 10, wherein:
a second particular pixel of the plurality of color pixels controlled to pass the backlight corresponds with a second aligned pixel of the plurality of monochrome pixels at the first transmit level, a plurality of second parallax pixels of the plurality of monochrome pixels at the first transmit level, and a plurality of second neighboring pixels of the plurality of monochrome pixels at the one or more second transmit levels;
the plurality of second parallax pixels completely surround the second aligned pixel; and
the plurality of second neighboring pixels completely surround the plurality of second parallax pixels.

15. The instrument panel according to claim 14, where one or more overlapping pixels of the plurality of monochrome pixels are set to the first transmit level due to the particular pixel instead of being set to the one or more second transmit levels due to the second particular pixel.

16. The instrument panel according to claim 14, where one or more overlapping pixels of the plurality of monochrome pixels are set to a highest of two different levels of the one or more second transmit levels due to both the particular pixel and the second particular pixel.

17. The instrument panel according to claim 10, wherein the electronic control unit and the plurality of displays are mountable in a vehicle.

18. A non-transitory computer readable medium on which is recorded instructions, executable by a processor, for control of a local-dimming display, wherein execution of the instructions causes the processor to:
control a light source of the local-dimming display, wherein the light source is configured to generate a backlight;
control a monochrome display of the local-dimming display, wherein the monochrome display is aligned with the light source and has a plurality of monochrome pixels, and each of the plurality of monochrome pixels is configured to selectively pass and block the backlight; and
control a color display of the local-dimming display, wherein the color display is aligned with the monochrome display and has a plurality of color pixels, wherein:
a particular pixel of the plurality of color pixels is controlled to pass the backlight;
the particular pixel corresponds with an aligned pixel of the plurality of monochrome pixels, a plurality of parallax pixels of the plurality of monochrome pixels, and a plurality of neighboring pixels of the plurality of monochrome pixels;
the aligned pixel is controlled to pass the backlight at a first transmit level;
the plurality of parallax pixels are controlled to pass the backlight at the first transmit level and forms at least a 7×7 array that completely surrounds the aligned pixel;
the plurality of neighboring pixels are controlled to pass the backlight at one or more second transmit levels and completely surround the plurality of parallax pixels;
the one or more second transmit levels are less than or equal to the first transmit level; and
the plurality of the monochrome pixels cooperating at the first transmit level and the one or more second transmit levels selectively present the backlight to the color display with a declining intensity pattern in the plurality of neighboring pixels.

19. The non-transitory computer readable medium according to claim 18, wherein the declining intensity pattern comprises a Gaussian tapering in the one or more second transmit levels.

20. The non-transitory computer readable medium according to claim 18, wherein:
a plurality of buffer pixels of the plurality of monochrome pixels are disposed between the plurality of parallax pixels and the plurality of neighboring pixels:
the execution of the instructions causes the processor to control to the one or more second transmit levels; and
the declining intensity pattern extends through the plurality of buffer pixels.

* * * * *